United States Patent

Koff

[15] 3,688,371
[45] Sept. 5, 1972

[54] THE METHOD OF MANUFACTURING COMPOSITELY FORMED ROTORS

[72] Inventor: Bernard L. Koff, Cincinnati, Ohio

[73] Assignee: General Electric Company,

[22] Filed: April 30, 1970

[21] Appl. No.: 33,437

[52] U.S. Cl. .......................... 29/156.8 B, 29/156.8 R
[51] Int. Cl. ....... B21k 3/04, B23p 15/02, B23p 15/04
[58] Field of Search....29/156.8 R, 156.8 B, 156.8 H, 29/156.8 P, 156.8 E, 156.8 CF, 156.8 FC; 416/223; 244/153

[56] References Cited

UNITED STATES PATENTS

| 730,363 | 6/1903 | Geisenhoner | 29/156.8 B |
| 2,537,739 | 1/1951 | Chilton | 29/156.8 P |
| 2,548,886 | 4/1951 | Howard | 29/156.8 R |
| 2,749,026 | 6/1956 | Hasbrouck | 29/156.8 R |
| 3,246,389 | 4/1966 | Pfau | 29/156.8 B |
| 3,255,515 | 6/1966 | Clarke | 29/156.8 R |
| 3,368,744 | 2/1968 | Jenn | 29/156.8 CF |
| 3,494,578 | 2/1970 | Cureton | 244/153 |

*Primary Examiner*—John F. Campbell
*Assistant Examiner*—Donald P. Rooney
*Attorney*—Derek P. Lawrence, Frank L. Neuhauser, Oscar B. Waddell, Joseph B. Forman and Edward S. Roman

[57] ABSTRACT

The present disclosure is of a disc type compressor rotor. One disc has an integral annular spacer with an inwardly projecting radial flange which is bolted to a flange projecting inwardly from the rim of an adjacent disc. The flanges are clamped together by bolts which also provide positive locating means for preventing relative radial shifting between the connected discs. A method for forming rotors with this positive locating function is also described.

5 Claims, 5 Drawing Figures

INVENTOR.
BERNARD L. KOFF
BY
ATTORNEY

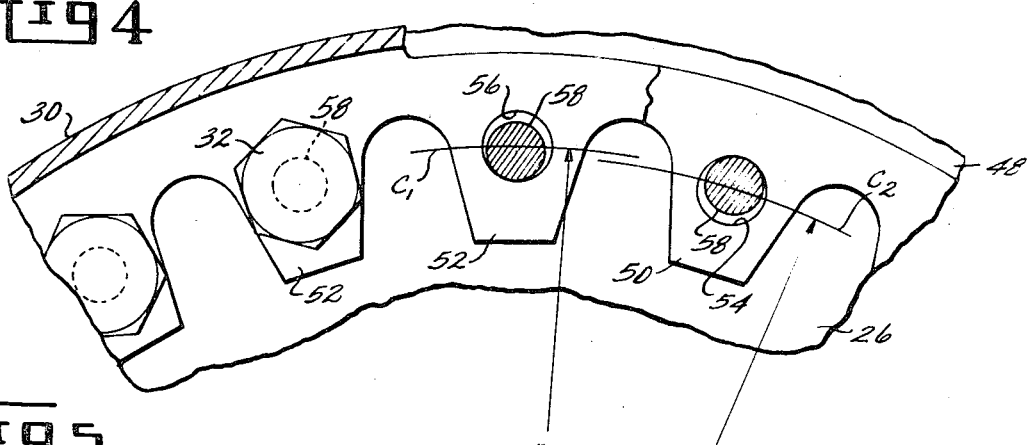
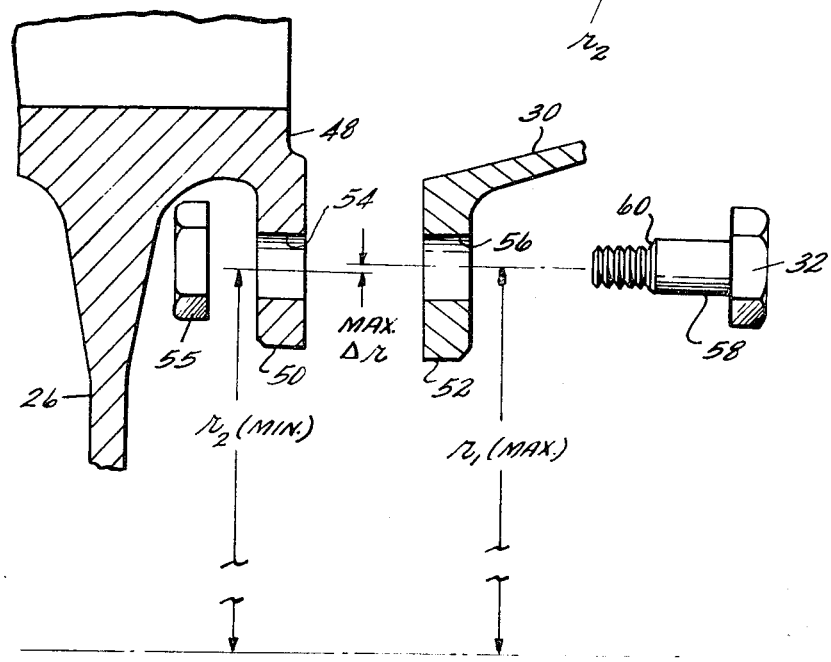

THE METHOD OF MANUFACTURING COMPOSITELY FORMED ROTORS

The invention described and claimed in the U.S. patent application herein resulted from work done under United States Government contract FA–SS–66–6. The United States Government has an irrevocable, non-exclusive license under said application to practice and have practiced the invention claimed herein, including the unlimited right to sublicense others to practice and have practiced the claimed invention for any purpose whatsoever.

The present invention relates to improvements in rotor constructions and their methods of manufacture particularly to meet the requirements of gas turbine engines.

While not so limited in all aspects, the present invention is motivated by the peculiar needs of high performance gas turbine engines and particularly multistage compressor and/or turbine rotors found in such engines. To give a brief description, radially projecting blades are mounted on these rotors in circumferential, axially spaced rows. In almost all instances the blades are removably mounted on the rotors by dovetail tang arrangements or the like. In many instances the centrifugal loading of the blades requires that each row be mounted around the periphery of a disc in order that sufficient metal will be provided to meet structural strength requirements. In lightweight rotor constructions these discs are spaced apart by annular shells or spacers to accommodate vanes which are interdigitated between adjacent rows of blades.

Many approaches have been taken to the construction and method of manufacturing disc type rotors as described above. The objectives for such constructions are generally well known. They include lightweight which involves efficient use of metal in taking the high stress loading thereon, particularly the stress loading resulting from centrifugal force. Ease of manufacture is another objective which generally results in the disc and spacer components being bolted or otherwise separably secured together. The separability of such rotor components is also desirable in maintenance work. However, where rotors have been secured together and other objectives met, problems have arisen in that the rotor components can, under certain operating conditions, slip in a radial or transverse sense relative to each other, thereby throwing the rotors out of balance. A large unbalance can result in failure of the bearings or engine support structure. Even a moderate amount of unbalance can be caused by a relative shifting of as little as 0.001 inches, and require engine shutdown and maintenance action before the engine can be returned to service.

Among the objects of the present invention are the provision of an improved disc type rotor construction and a method for its manufacture which meets or exceeds the objectives outlined above and which gives utmost assurance against radial shifting of rotor components and the resultant rotor unbalance.

A further and more specific object of the invention is to provide positive assurance that there will be no relative slippage between components of a rotor which are held together by bolts.

The above and other related objects, as well as the various features of the invention, will be apparent from a reading of the following description of the disclosure found in the accompanying drawings and the novelty thereof pointed out in the appended claims.

In the drawings:

FIG. 4 is a section taken on line IV-IV with portions thereof further broken away; and FIG. 5 is a section similar to FIG. 3 showing the portions thereof in exploded position and illustrating another extreme of conditions.

Figure 1:
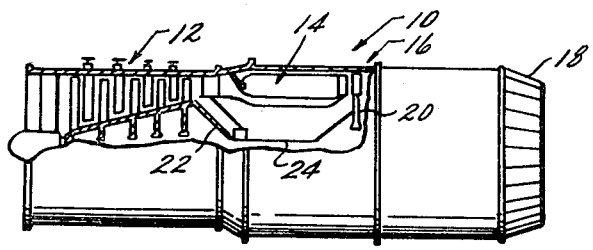
FIG. 1 is a simplified view, particularly in section, of a gas turbine engine in which a rotor of the present invention is employed.

FIG. 1 briefly shows a gas turbine engine 10 of the type employed in the propulsion of aircraft. Such an engine comprises an axial flow compressor 12 which pressurizes air to support combustion of fuel in a combustor 14 and thus generates an annular hot gas stream. A portion of the energy of this hot gas stream drives a turbine 16 which powers the compressor 12. The remainder of the energy of the hot gas stream is converted to a propulsive force by being discharged from a nozzle 18.

The turbine 16 comprises a rotor 20 which is joined to the compressor rotor 22 of the present invention by a shaft 24. The compositely formed engine rotor comprising these elements is appropriately journaled in frame components of the engine which can take various forms well known to those skilled in the art.

Figure 2:
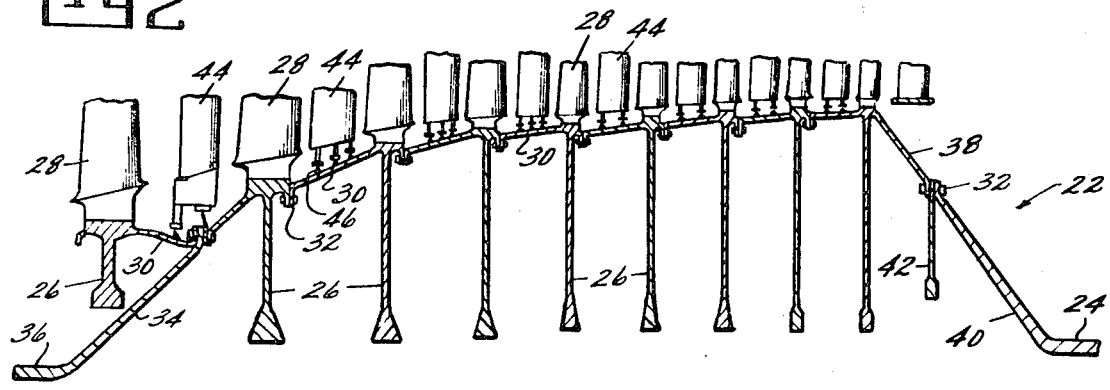
FIG. 2 is a longitudinal section of the compressor rotor briefly illustrated in FIG. 1.

FIG. 2 illustrates the composite fabrication of the compressor rotor 22 in greater detail. This rotor comprises a series of discs 26 around the peripheries of which are mounted blades 28 constituting the several rows or stages of the compressor rotor. Each disc also has an integral annular spacer 30, which (with the exception of the first and second stage discs) is connected to the adjacent upstream disc 26 by bolts 32. The spacers 30 of the first and second stage discs are secured to each other and to the conical portion 34 of a hollow shaft 36, also by bolts 32. The last stage disc 26 also has an integral conical flange 38 which is secured to the conical portion 40 of shaft 24 by bolts 32. A disc 42 is interposed between the flange 38 and the conical portion 40 to provide greater strength and rigidity for this bolted connection.

The annular spacers 30 space the rotating blade rows so that stationary vane rows 44, supported by the compressor casing, may be mounted therebetween. These vanes turn the air in a known fashion so that it has a proper angle of attack on the next succeeding blade row. Labyrinth-type seals 46 are provided between the vane rows and the spacers 30.

Figure 3:
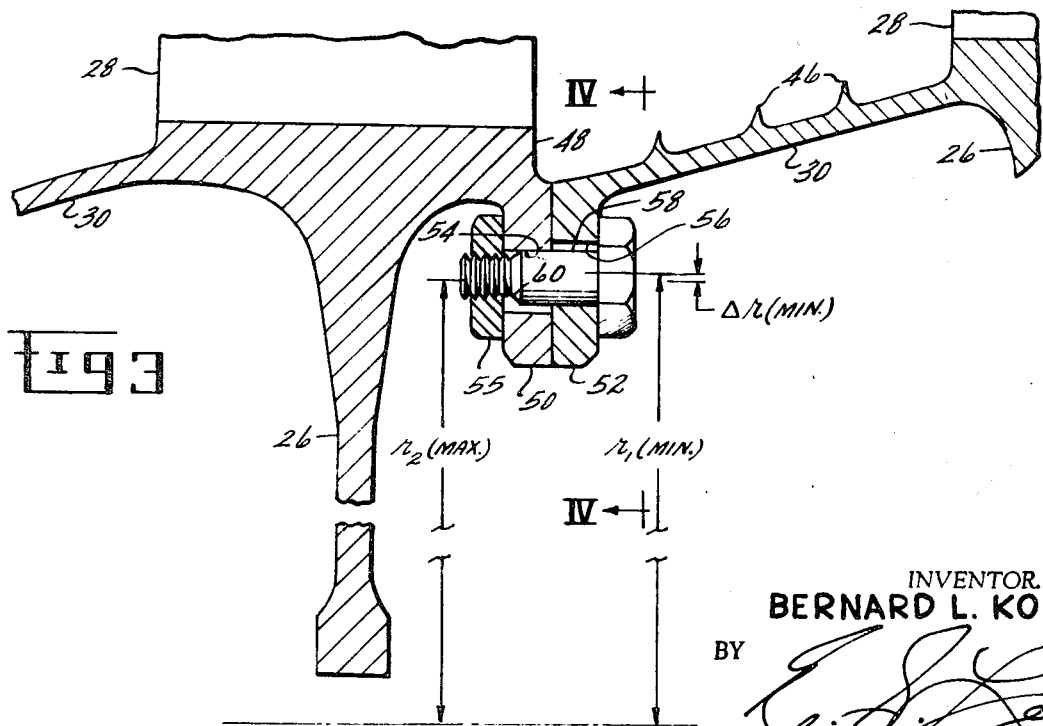
FIG. 3 is an enlarged fragmentary portion seen in FIG. 2 illustrating one extreme of conditions.

The bolted connection between each disc 26 and the adjacent upstream disc spacer 30 (again excluding the connection between the first and second stage discs) is typically illustrated in greater detail by FIGS. 3—5. These discs have an enlarged rim 48 to provide for tang mountings of the blades 28. An inwardly projecting flange 50 extends from the downstream side of the rim 48 in closely spaced relation from the disc 28. The spacer 30 also has at its upstream end an inwardly projecting flange 52. The bolts 32 pass through holes 54, 56 formed respectively in the flanges 50, 52. Nuts 55 are tightened on the bolts 32 to clamp the flanges together and complete the bolted connection. It will be seen that the flanges 50 and 52 are scalloped, to the depth of the holes, between bolt holes to essentially eliminate loss of clamping force due to the effect of Poisson's ratio when operating at high rotational speeds.

The holes 54 and 56 are equi-angularly formed about, what is referenced as, bolt circles, $c_1$, and $c_2$, which are concentric with the axis of the disc and rotor and have radii $r_1$ and $r_2$ respectively. It is recognized that, for practical manufacturing purposes, there must be an allowed variation in the location of the axes of the holes 54 and 56 from the nominal radii of the bolt circles. Also it is recognized that there will be variations in the diameters of the holes 54 and 56 as well as the body portions 58 (of bolts 28) from their nominal diameters. In other words, the referenced dimensions will have given allowable maximum and minimum values.

In accordance with one aspect of the invention, the parts are formed by manufacturing these components in such a fashion that there is an assured contact between the body portion 58, bolt 28 and holes 54, 56 which prevents the spacer 30 from shifting outwardly in a radial sense relative to the disc 28. This is shown by FIGS. 3 and 4 where differences in dimensions are greatly exaggerated for sake of illustration.

In FIG. 3, this assured positioning is illustrated in its minimum condition with the holes 54, 56 formed at maximum allowable diameters and the bolt body portion 58 formed at a minimum allowable diameter. This results in a maximum combined clearance between the body portion 58 and the holes 54 and 56. The axis of the hole 56 is formed at a minimum allowable radius $r_1$ from the disc or rotor axis which is greater than the maximum allowable radius $r_2$ of the axis of the hole 54 from the disc or rotor axis, by a distance $\Delta r$ at least equal to the maximum combined radial clearance between the bolt body portion 58 and the holes 54 and 56. This extreme condition is illustrated in FIGS. 3 and 4 showing a zero clearance between the bolt body 58 and the outer surface of hole 54 and also a zero clearance between the bolt body 58 and the inner surface of the hole 56.

FIG. 5 illustrates the opposite extreme of allowable dimensions employed in forming these components. The diameters of holes 54 and 56 are at a given allowable maximum while the bolt body portion 58 is formed at a given allowable maximum. The bolt circle radius for hole 54 is at a given allowable minimum $r_2$ while the bolt circle radius for hole 56 is at a given allowable maximum $r_1$. This results in a maximum $\Delta r$.

By forming the flange 52 at the end of the long annular spacer 30, the radial deflection, upon assembly of the bolts 32 can readily be taken in the flexible shell spacer 30 with a minimum of stress. At the same time the flange 50, being closely spaced from the adjacent disc 26 gives a high degree of rigidity to the bolted assembly. Under any conditions other than a minimum $\Delta r$ there will be deflection of the spacer 30 as a bolt is inserted into the holes 54, 56. This is facilitated by a bevel 60 between the bolt threads and body portion 58. The bolts can be drawn into assembled relation by the nuts 55.

From the above it will be apparent that the described bolted connection between adjacent discs 26 gives positive assurance against relative radial or transverse slippage and consequent rotor unbalance attributable to the connection. The minimum $\Delta r$ conditions of FIGS. 3 and 4 provide positive metal contact between the bolt body 58 and the surfaces of holes 54, 56 so as to prevent relative outward displacement of the flange 52. This flange is formed on the relatively flexible spacer 30 while the flange 50 is formed on the relatively rigid rim 48. Thus, the bolt body 58 positively prevents relative radial growth in the direction it will occur under dynamic loading. The closely spaced bolts 32 also firmly clamp the flanges 50, 52 together so that there is a friction force preventing radial displacement in either direction at all times. It will be recognized that all of the bolt connections are formed in the same fashion in the pair of flanges so that there are bolts on the opposite side of the rotor axis to maintain the positive positioning function described.

The above description has been based on the assumption that the axes of matching holes 54, 56 lie in the same radial plane, i.e., have identical angular spacing between adjacent holes. In actuality there may be some misalignment in this sense. Such misalignment only further assures positioning positive contact between the bolt body 58 and the surfaces of the holes. Further, it will be noted that the scalloping of the flanges gives circumferential flexibility to minimize stresses as well as to facilitate assembly when such misalignment occurs.

The described manner of forming a bolted connection is particularly effective when joining rotor components with bolts on a bolt circle having a large radius, in the described rotor the connections between the second stage disc and subsequent downstream discs. Other bolted connections can, however, also advantageously employ these features.

Other features to be noted are that the discs 28 are joined together without forming any holes therein. This means that there are no stress risers which would require a greater mass of disc material to carry a given load. By having the bolted connections between adjacent discs closely adjacent the disc and the spacer integral with one disc means that only one bolted connection is required between each disc and further that the centrifugal loading of the bolt connection can be efficiently carried into the disc rim.

The referenced steps of forming rotor components in a prescribed fashion would be done by lathe turning, jig boring and other obvious manufacturing techniques in the manner described to give an improved rotor construction with practical tolerances and resultant economy of manufacture.

Various modifications of the preferred embodiment described will occur to those skilled in the art, as for example, the use of stud bolts to facilitate assembly instead of the more common type of bolt described. The scope of the present inventive concepts are therefore to be derived solely from the appended claims.

Having thus described the invention, what is claimed as novel and desired to be secured by Letters Patent of the United States is:

1. The method of manufacturing a rotor which is to include two cylindrical components held in assembled relation by a plurality of bolts with each bolt passing through matching holes formed respectively in the two components, said holes being parallel to the component axes and angularly spaced thereabout, said method comprising the steps of:

forming bolts having body portions with given minimum and given maximum diameters, forming the bolt holes in one component with each hole having a given maximum and a given minimum diameter and with the axis of each hole being spaced from the axis of the component on a radius having a given allowable minimum and a given allowable maximum radius dimension, forming bolt holes in the other component, respectively matching the holes in the one rotor, with each hole in the other component having a given minimum and a given maximum diameter and with the radius from the axis of each bolt hole to the axis of the other component having a given allowable minimum and a given allowable maximum dimension with the given allowable minimum radius dimension being greater than the given allowable maximum radius dimension of the matching bolt hole in said one component by a distance at least equal to the maximum clearance between the body portion of the bolt and the hole in one rotor plus the maximum clearance between the body portion of the bolt and the matching hole in the other rotor, and securing said bolts in said matching holes to join said cylindrical components.

2. The method of claim 1 in which the cylindrical components comprise a pair of discs and at least one disc has an integral annular spacer with a flange at its free end and the other disc has a matching flange integral therewith and closely spaced therefrom and further wherein, the bolt holes are formed in said flanges and the bolts secured in the matching holes are tightened to clamp said flanges together.

3. A method as in claim 2 wherein, the bolt holes are formed on a given bolt circle radius in the flange of one component and on another bolt circle radius in the flange of the other component to obtain and further wherein the bolt holes are formed with equi-angular spacing around said flanges.

4. A method as in claim 2 wherein, the bolt holes are formed in the closely spaced flange on a bolt circle radius having a given allowable maximum radius and, the bolt holes are formed in the spacer flange on a bolt circle having a given minimum allowable distance which is at least equal to the maximum clearance between the body portions of the bolts and the holes in the flanges and further wherein, the bolt holes are formed with equi-angular spacing around said flanges.

5. A method as in claim 4 further including the step of:

scalloping said flanges to a distance approximately equal to the actual surfaces of said bolt holes.

* * * * *